United States Patent
Singleton

(10) Patent No.: US 6,334,953 B1
(45) Date of Patent: Jan. 1, 2002

(54) STORM WATER DRAINAGE FILTER ASSEMBLY

(76) Inventor: Roger Singleton, 1060 Ellington Rd., Oxford, GA (US) 30054

(*) Notice: Subject to any disclaimer, the term of this patent is extended or adjusted under 35 U.S.C. 154(b) by 0 days.

(21) Appl. No.: 09/448,636

(22) Filed: Nov. 24, 1999

(51) Int. Cl.⁷ .............................................. B01D 35/02
(52) U.S. Cl. ........................ 210/232; 210/460; 405/36
(58) Field of Search ................................ 210/232, 459, 210/461, 460, 474, 499, 166, 478; 405/36, 40, 50

(56) References Cited

U.S. PATENT DOCUMENTS

| | | | |
|---|---|---|---|
| 217,906 A | 7/1879 | Shaler | |
| 381,990 A | 5/1888 | Driller | |
| 621,937 A | 3/1899 | Niemann | |
| 770,019 A | 2/1904 | Neireiter | |
| 1,310,055 A | 7/1919 | Caldwell | |
| 1,678,622 A * | 7/1928 | Horne | 210/460 |
| 1,791,512 A | 2/1931 | Schurman | |
| 2,419,501 A | 4/1947 | Pinto | 210/90 |
| 2,887,073 A | 5/1959 | Thompson | 108/28 |
| 3,419,151 A | 12/1968 | Smith et al. | 210/460 |
| 3,481,475 A | 12/1969 | Ruthrof et al. | 219/394 |
| 3,517,803 A | 6/1970 | Thaler | 210/166 |
| 3,537,593 A | 11/1970 | Ruthrof et al. | 210/409 |
| 3,628,668 A | 12/1971 | Huppert | 210/446 |
| 3,713,539 A | 1/1973 | Thompson et al. | 210/164 |
| 3,724,669 A | 4/1973 | Thal | 210/409 |
| 3,762,562 A | 10/1973 | Okuniewski et al. | 210/460 |
| 3,804,258 A | 4/1974 | Okuniewski et al. | 210/460 |
| 3,904,121 A | 9/1975 | Geagan | 239/208 |
| 3,966,121 A | 6/1976 | Littman | 239/197 |
| 4,183,368 A | 1/1980 | Husted | 154/166 |
| 4,268,390 A | 5/1981 | Cunningham | 210/232 |
| 4,303,519 A | 12/1981 | DelVecchio | 210/238 |
| 4,419,232 A | 12/1983 | Arntyr et al. | 210/164 |
| 4,460,462 A | 7/1984 | Arneson | 210/163 |
| 4,525,273 A | 6/1985 | Logsdon | 210/164 |
| 4,658,449 A | 4/1987 | Martin | 4/496 |
| 4,765,352 A | 8/1988 | Strieter | 134/99 |
| 4,837,987 A | 6/1989 | Fender | 52/11 |
| 4,906,367 A * | 3/1990 | Villagomez | 210/460 |
| 4,925,342 A | 5/1990 | Hendy | 405/45 |
| 4,935,132 A | 6/1990 | Schaier | 210/163 |
| 4,972,863 A | 11/1990 | Morrow | 134/166 |
| 5,089,108 A * | 2/1992 | Small | 210/460 |
| 5,107,635 A | 4/1992 | Carpenter | 52/12 |
| 5,150,499 A * | 9/1992 | Berfield | 361/212 |
| 5,220,755 A | 6/1993 | Roles | 52/16 |
| 5,284,580 A | 2/1994 | Shyh | 210/163 |
| 5,297,367 A | 3/1994 | Sainz | 52/12 |
| 5,297,895 A | 3/1994 | Johnson | 405/41 |
| 5,302,283 A | 4/1994 | Meuche | 210/162 |
| 5,350,526 A * | 9/1994 | Sharkey et al. | 210/323.2 |
| 5,403,474 A | 4/1995 | Emery | 210/163 |
| 5,406,966 A | 4/1995 | Lepkowski et al. | 134/104.4 |
| 5,427,417 A | 6/1995 | Lechuga | 285/46 |
| 5,452,546 A | 9/1995 | Goddard | 52/12 |
| 5,469,670 A | 11/1995 | Thaler | 52/12 |
| 5,480,254 A | 1/1996 | Autry et al. | 404/2 |

(List continued on next page.)

*Primary Examiner*—John Kim
(74) *Attorney, Agent, or Firm*—Womble Carlyle Sandridge & Rice, PLLC

(57) ABSTRACT

A filter assembly is mounted on the discharge end of an outlet pipe of a storm water drainage system for filtering and collecting silt, dirt and other debris from runoff water flows. The filter assembly includes a collar member mounted within the discharge end of the outlet pipe and a filter bag that is removably attached to a downstream end of the collar member. The water flow being discharged from the outlet pipe of the storm water drainage system is channeled through the filter bag, which filters and collects the sediment and debris therefrom while enabling the substantially cleaned runoff water to pass through the filter bag for drainage into a stream, pond, or other water source.

3 Claims, 3 Drawing Sheets

U.S. PATENT DOCUMENTS

| | | | |
|---|---|---|---|
| 5,486,287 A | 1/1996 | Murphy et al. | 210/164 |
| 5,511,903 A | 4/1996 | Nichols et al. | 405/43 |
| 5,526,613 A | 6/1996 | Simeone, Jr. | 52/12 |
| 5,573,349 A | 11/1996 | Paoluccio | 405/52 |
| 5,575,925 A | 11/1996 | Logue | 210/747 |
| 5,587,072 A | 12/1996 | Regan | 210/232 |
| 5,643,445 A | 7/1997 | Billias et al. | 210/162 |
| 5,650,065 A | 7/1997 | Sewell | 210/166 |
| 5,720,878 A * | 2/1998 | Bolyard | 210/337 |
| 5,744,048 A | 4/1998 | Stetler | 210/803 |
| 5,862,632 A | 1/1999 | Zima | 52/16 |
| 5,948,249 A * | 9/1999 | Scott | 210/460 |
| 6,063,270 A * | 5/2000 | D'Offay | 210/232 |

\* cited by examiner

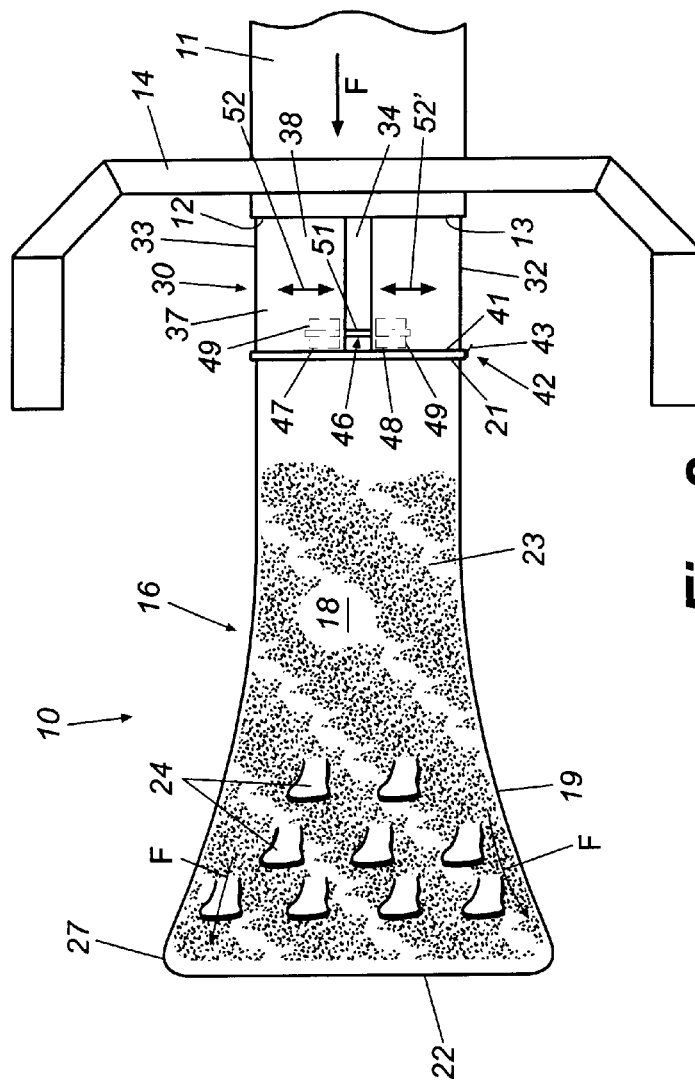
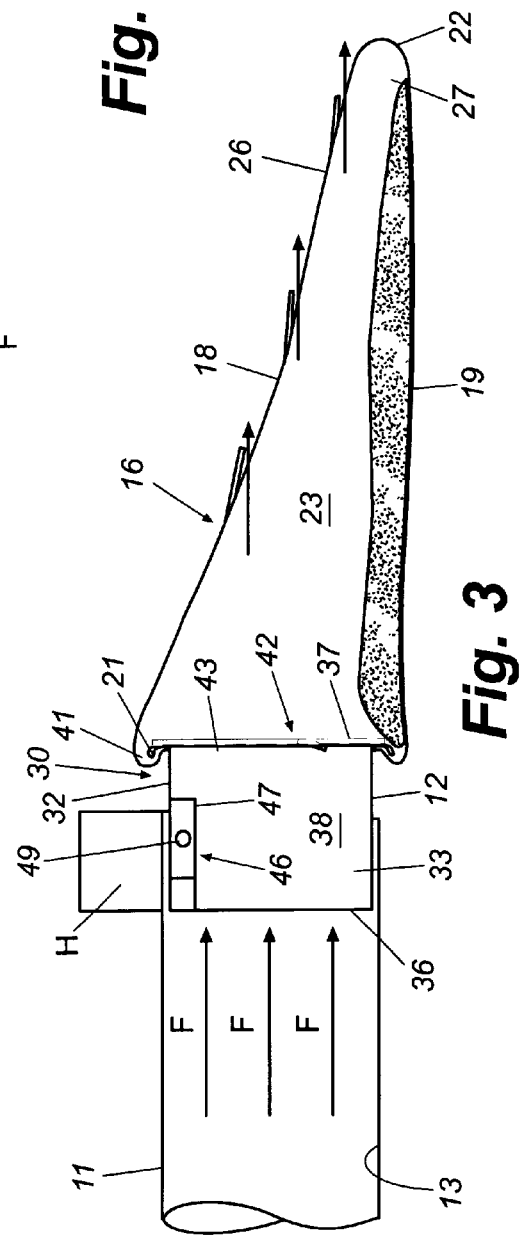
Fig. 2
Fig. 3

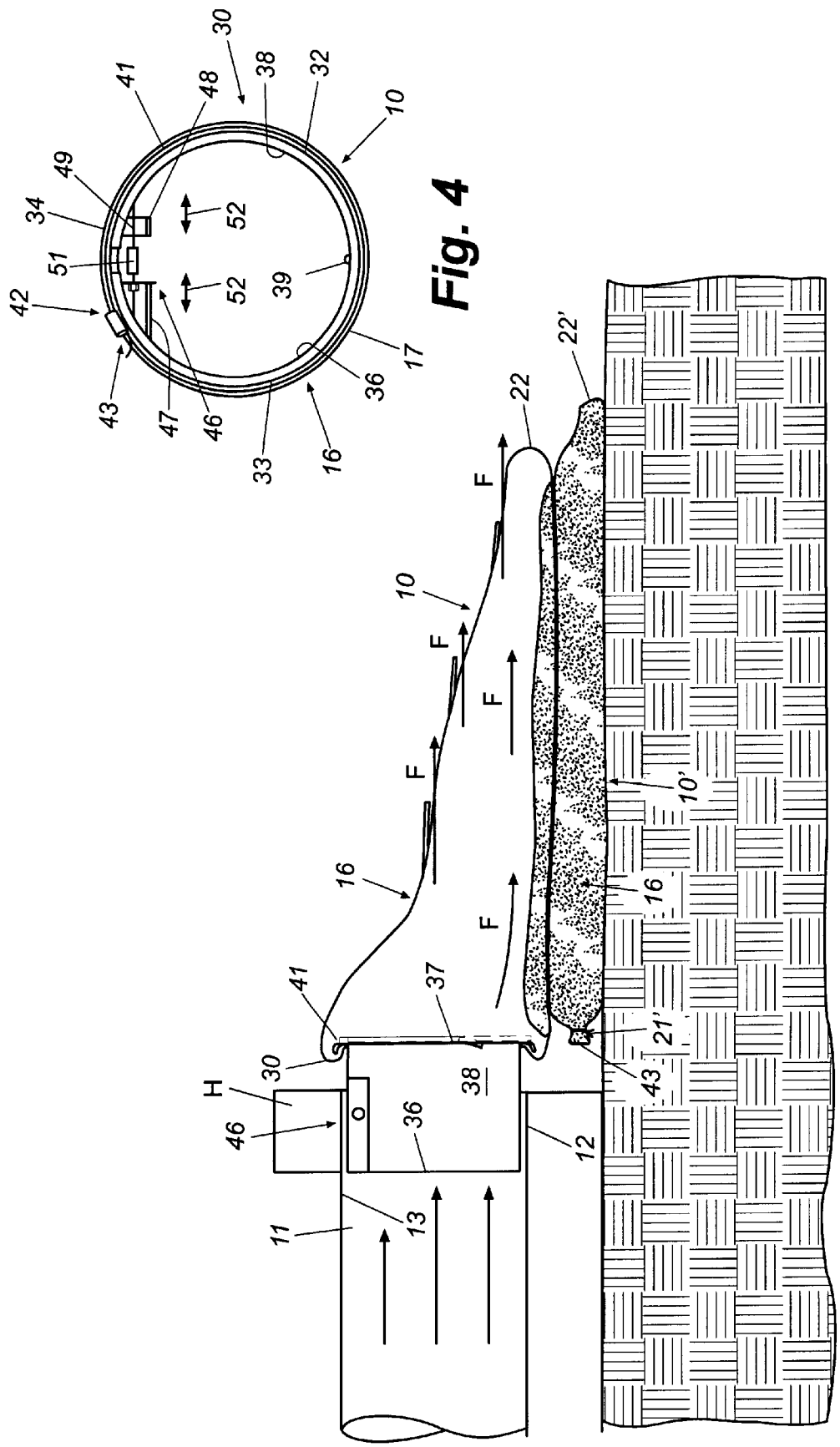

STORM WATER DRAINAGE FILTER ASSEMBLY

FIELD OF THE INVENTION

The present invention relates in general to devices for filtering silt and debris from water flows, and in particular to a device that fits over the open end of a storm water drainage system outlet so as to collect and filter silt and other storm debris from runoff water flowing through storm water drainage pipes.

BACKGROUND OF THE INVENTION

In the construction of new housing and other types of developments, the road system generally is first marked out and the streets into and through the development are cut and graded. Thereafter, the storm water drainage system for the development is constructed, which typically includes the underground drainage pipes, collection boxes and culverts, and drop inlets that form the manholes or drain openings along the street, and outlet pipes for discharging the runoff water. During such construction and thereafter, however, dirt, silt and debris are typically washed into and collected within the collection boxes and discharge pipes of the storm water drainage system. Since these storm water drainage systems almost always dump the water, and thus, the debris carried therewith into a stream, lake, river or other water source, it is necessary and desirable to clean this water flow of as much debris and silt as possible because of potential environmental hazards to fish, animals and humans from such a build-up of dirt and debris and the potential clogging of the drainage pipes due to such build-up.

Trying to periodically clean the silt and debris from a storm sewer drainage pipes is, however, a difficult operation and generally is not very effective as heavy rainstorms and cleaning/washing of the street during construction not only washes more silt and debris into the drainage pipes, but the silt and debris collected within the storm sewer drainage pipes typically will be washed along and out of the pipes with this run-off or cleaning water. In addition, these cleaning efforts at times will simply involve hosing or spraying the dirt or debris out of the pipes.

Storm water drainage filters have been developed for filtering run-off water to remove sand and debris therefrom to prevent the collection of such dirt and debris within the storm water drainage system pipes. For example, see my U.S. Pat. No. 5,843,306 discloses a silt guard system for blocking the passage of silt and debris from being washed into a storm water inlet while still enabling runoff water to drain easily therethrough. In addition, U.S. Pat. Nos. 5,297,367, 5,744,048, 5,643,445, 5,587,072, 5,575,925 and 4,268,390 further disclose storm drain screens or outlet filters for filtering or trapping debris being carried into a storm sewer. These conventional filter devices, however, typically require a filtering structure that is mounted over or within a storm sewer and often includes a removable filter which must be frequently removed for cleaning or replacement after collection of dirt and debris therein.

Accordingly, it can be seen that a need exists for a device for filtering runoff water from a storm water drainage system of silt and other debris, which addresses these and other problems in the art.

SUMMARY OF THE INVENTION

Briefly described, the present invention generally comprises a filter assembly for filtering silt and debris for run-off water discharged from a outlet pipe of a storm water drainage system. The filtering assembly mounts to the outlet or discharge end of the storm sewer outlet pipe, enclosing the discharge end of the outlet pipe. As a result, the water flow being discharged from the outlet pipe of the storm sewer is discharged through the filter assembly whereupon it is substantially filtered and cleaned of silt, dirt and other debris to prevent this silt, dirt and other debris from being carried with the water flow into nearby streams, rivers, lakes, etc.

The filter assembly generally includes a filter bag having a bag body formed from a filtering material. The filter bag body includes an open proximal or first end and a closed distal or second end and upper and lower bag walls that define an inner bag chamber in which a silt, debris, etc. is collected or trapped. Flaps in the upper surface or wall of the bag body enable excess run-off water to drain therefrom as the bag becomes filled with collected silt and debris. A collar member, typically having a cylindrical or rectangular configuration so as to mate with or engage the inner wall of the outlet pipe of the storm water drainage system, is as attached to the proximal or first end of the filter bag for connecting the filter bag to the outlet pipe.

The collar member generally is formed from one or two pieces, defining a pair of opposed sections and generally is made of a metal material. The collar member includes a sidewall adapted to engage and bear against the inner wall of the outlet pipe to secure the collar member in place within the outlet pipe. The collar member further includes upstream and downstream ends with the upstream end being received within the outlet pipe and with the first end of the filter bag being received over and secured to the downstream end of the collar member. A rim is formed at the downstream end, with the rim typically comprising an annular flange that projects radially from the sidewall of the collar member. The rim can be substantially flat or also can be curled over toward the sidewall of the collar member. The rim provides a bearing surface against which the proximal or first end of the filter bag is secured using a cable tie, adhesive, hooks or other similar fastening mechanism so as to prevent the filter bag from being dislodged from the collar member as the water flow passes therethrough and as silt and debris is collected and builds up within the inner chamber of the bag. An expansion assembly also is mounted within the collar member between the opposed sections. The expansion assembly can be adjusted to urge the sections together or apart as needed to fit the outlet pipe so that the sidewall of the collar member is urged into tight engaging contact with the inner sidewall of the outlet pipe.

In use, the collar member is fitted within the outlet pipe and its expansion assembly adjusted so as to urge the sidewall of the collar member into tight engaging contact with the inner wall of the outlet pipe. The filter bag is then applied over and is secured to the downstream end of the collar member with the open or proximal end of the outlet bag being secured against the rim of the collar member. Thereafter, as runoff water flows through the storm water drainage system and out of the outlet pipe, it is discharged through the filter bag, which collects and traps dirt, silt and other debris while the water flow passes through the filtering material of the filter bag so as to substantially clean the water flow of silt, dirt and other debris. Once the filter bag has been filled with collected debris and dirt, the filter bag can be removed and its open proximal end sealed. The filter bag can either then be left in place with a new filter bag being installed on top of the filled filter bag, or can removed and used as a retaining support, or openings can be formed in the top of the filter bag and vegetation planted therein to help in erosion control around the discharge end of the outlet pipe.

Various objects, features and advantages of the present invention will become apparent to those skilled in the art upon a review of the following specification, when taken in conjunction with the accompanying drawings.

BRIEF DESCRIPTION OF THE DRAWINGS

FIG. 2 is a plan view illustrating the mounting of the filter assembly of the present invention to the discharge end of the outlet pipe.

FIG. 3 is a side elevational view taken in partial cross section of the filter assembly of the present invention mounted to an outlet pipe of a storm water drainage system.

FIG. 4 is an end view of the collar member of the present invention.

FIG. 5 is a side elevational view illustrating a first filter bag of the present invention being filled and installation of a second filter assembly of the present invention installed thereover on the outlet pipe of a storm water drainage system.

DETAILED DESCRIPTION

Figure 1:
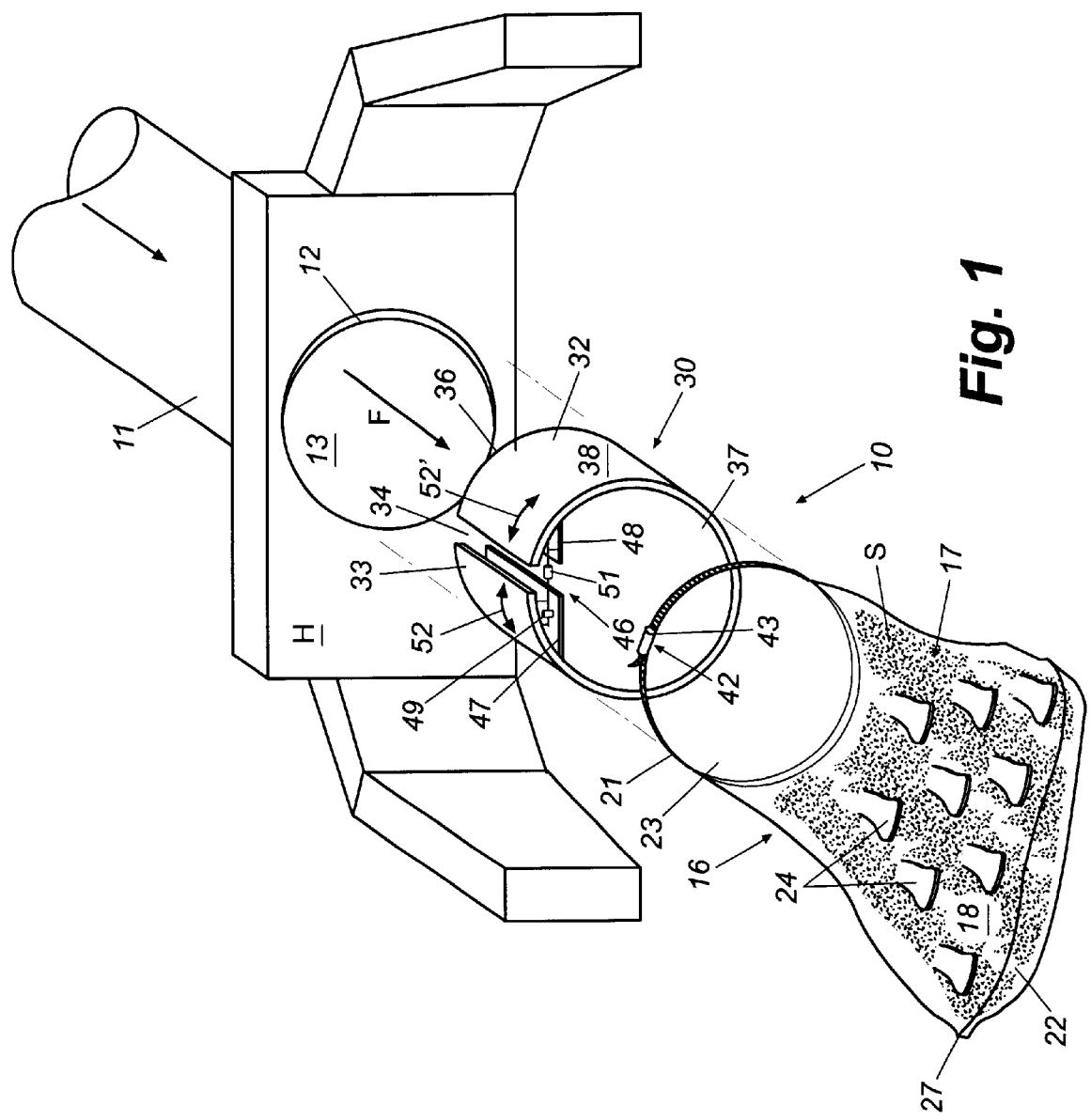
FIG. 1 is a perspective illustration showing the filter assembly of the present invention mounted to the discharge end of an outlet pipe of a storm water drainage system.

Referring now to the drawings in greater detail in which like numerals indicate like parts throughout the several views, FIG. 1 illustrates the filter assembly 10 of the present invention for mounting to an outlet pipe 11 of a storm water drainage system for filtering silt or dirt and other debris S from a flow of runoff water F being discharged through the storm water drainage system. The outlet pipe 11 is generally mounted to a headwall H with the discharge end 12 of the outlet pipe projecting therethrough and includes an inner sidewall 13 as shown in FIG. 1. The flow of runoff water is passed through the storm water discharge system, as indicated by arrows F, and passes out of the discharge pipe 11 through the filter assembly 10 of the present invention for cleaning the water flow of silt and other debris to retard the passage of dirt, silt, debris and other contaminants being carried by the water flow into a stream, river, lake or other nearby water source.

As illustrated in FIGS. 1–3, the filter assembly 10 includes a filter bag 16 having a body 17 formed from a filtering material. Typically, this filtering material will include a silt screen or similar mesh filtering material formed from plastic or a similar material such as nylon, polyester, polyethylene, polyolefin, polystyrene or various types of natural filtering materials, including cotton or other similar woven and non-woven materials. The body of the filter bag includes an upper surface or wall 18, a lower surface or wall 19, an open upstream first or proximal end 21 and a closed downstream second or distal end 22 so as to define an open ended internal bag chamber 23 in which silt S is collected as the waterflow F passes through the filter bag. A series of flaps 24 are generally formed in the upper surface or wall 18 of the filter bag body 17. The flaps enable excess water from the runoff water flow to drain from the filter bag as the filter bag becomes filled with silt and other debris to prevent a back-up or blockage of runoff water within the discharge pipe of the storm water discharge system.

As indicated in FIG. 2, the body of the filter bag generally expands outwardly along its length, with the width of the distal end 22 of the bag typically being of approximately 2 to 3 times the diameter of the discharge end 12 of the outlet pipe 11 of the storm water discharge system, although larger or smaller widths also can be used as desired. The increasing width of the second or distal end 22 of the body of the filter bag tends to cause the silt and other debris being carried by the runoff water flow F to more readily flow into the corners 26 and 27 of the filter bag as the water flow passes therethrough. As a result, the silt and debris tends to collect first at the corners of second or distal end of the body of the filter bag, which tends to stabilize and secure the second or distal end of the filter bag as the water flow initially is passed therethrough. This also helps to prevent clogging or blocking of the filter bag as silt and debris collects therein. Similarly, the length of the filter bag typically is approximately 4 to 5 times the diameter of the discharge end of the outlet pipe, although greater or lesser lengths also can be used as desired. The length of the filter bag generally is selected to enable a large volume of runoff water to be accommodated through the filter bag with the flow velocities of the runoff water flow being reduced by the flow being spread across the length of the filter bag.

A collar member 30 is received within discharge end 12 of the outlet pipe 11 as shown in FIGS. 1–3 and mounts the filter bag 16 to the outlet pipe 11. The collar member typically is cylindrical in shape or configuration so as to substantially match the configuration of most conventional outlet pipes to enable the collar member to be received and fit within the confines of the inner wall 13 of the outlet pipe as indicated in FIGS. 1–3. It will also be recognized and understood that other configurations for the collar member, such as rectangular or substantially square, also can be used as necessary to match the configuration or construction of the outlet pipe to which the filter assembly is to be mounted. Typically, the collar member 30 is formed from a metal such as steel but also can be formed from a resilient plastic material or similar resilient, durable, corrosion resistant material having a size or diameter that substantially matches the diameter or size of the discharge end 12 of the outlet pipe 11.

The collar member 30 generally includes a cylindrical or tubular body 31 that can either be formed from a single sheet or piece of material or pair of material pieces. Opposed sections 32 and 33 are defined in the body of the collar member with an expansion slot or channel 34 formed therebetween. The body 31 of the collar member 30 further includes an upstream end 36, downstream end 37 and a sidewall 38 adapted to engage and bear against the inner sidewall 13 of the outlet pipe 11 as indicated in FIGS. 2 and 3. In addition, as illustrated in FIG. 4, if the sections 32 and 33 of the body 31 of the collar member 30 are formed from discrete, separate pieces, they typically will be joined together with a hinge or similar fastening means 39 that extends along the length of the collar member below and approximately parallel to the expansion channel 34 formed between the sections 32 and 33.

As shown in FIGS. 1–3, an annular rim 41 is formed about the downstream end 37 of the body 31 of the collar member 30. The annular member 41 generally is a radially extending flange either formed with or otherwise attached to the downstream end of the collar member body. The annular rim 41 can either be substantially flat so as to project radially from the sidewall of the collar member body, or can be slightly curved over and toward the sidewall of the collar member body as indicated in FIG. 3. The rim 41 acts as a bearing surface about which the open first end of the filter bag is received and overlapped to resist or retard movement of the filter bag off of the collar member and subjected to a turbulent or heavy runoff water flow. As indicated in FIGS. 1 and 4, the open first end 21 of the filter bag 16 generally is secured about the annular rim 41 of the collar member 30 by a fastener 42 such as a nylon, plastic or wire tie 43, or can be otherwise secured to the rim by other fastening means such as books, rivets or adhesives so desired. As indicated in FIGS. 3 and 5, the filter bag thus is secured on the collar member, with its open first end 21 being extended about the open downstream end 37 of the collar member by fastener 42 to define an open passageway into the interior chamber 23 of the filter bag 16, along which the flow of runoff water F is directed and passes through the filter bag.

As shown in FIGS. 1 and 4, an expansion assembly or joint 46 is mounted between the sections 32 and 33 of the body of the collar member 30. The expansion assembly 46 generally includes frame members 47 and 48 mounted to the sections 32 and 33, respectively, of the body of the collar member. Expansion bolts 49 are mounted to each of the frame members 47 and 48 project inwardly toward the expansion channel 34. A turnbuckle 51 or similar fastener is positioned between the expansion bolts and receives the ends of the expansion bolts therewithin. As the turnbuckle is rotated, it tends to either draw or urge the expansion bolts 49 toward or away from one another so as to move the sections 32 and 33 of the body 31 of the collar member 30 toward and away from each other as indicated by arrows 52 and 52' (FIGS. 1 and 2). The expansion assembly thus enables the collar member to be expanded or retracted as necessary so that the diameter of its outer sidewall 38 is substantially matched with and is moved into tight engaging contact with the inner sidewall 13 of the outlet pipe 11 on which the filter assembly 10 is mounted. This enables the filter assembly of the present invention to be adjusted to accommodate varying size discharge openings or ends for various sized outlet pipes.

In use, the filter assembly 10 of the present invention is installed at the discharge end 12 of an outlet pipe 11 of a storm water drainage system by inserting the upstream end 36 of the collar member 30 into the open discharge end of the outlet pipe as indicated in FIGS. 1–3. The expansion assembly 46 is then engaged to adjust the size of the collar member by urging the sections of the body of the collar member outwardly and into engagement with the inner sidewall 13 of the outlet pipe 11 so as to secure the collar member in tight frictional engagement against the inner sidewall of the outlet pipe. Once the collar member has been secured within the discharge opening of the outlet pipe, the open first end 21 of the filter bag 16 is placed over the downstream end 37 of the collar member, with the first end 21 of the filter bag overlapping or wrapped over the downstream end and rim 41 of the collar member. The first end of the filter bag is then secured about the downstream end of the collar member by a fastener 42 such as a cable tie 43, adhesive or the like with a portion of the filter bag being bearing and secured against the rim 41 to help prevent the filter bag from becoming dislodged from the collar member as a result of turbulent or unusually high water flow volumes.

As the flow of runoff water passes through the outlet pipe and collar member and into the filter bag, the filtering material of the filter bag tends to screen or filter out silt, dirt and other debris from the water flow. The construction of the filter bag also tends to cause the water flow to urge the silt and debris to collect initially within the corners of the second or downstream end of the filter bag, which helps stabilize and secure the filter bag as the water flow continues to pass therethrough. As successive water flows are channeled the filter bag, the filter bag traps and retains the silt and debris from the water flow while allowing the water flow to pass through the body of the filter bag. Increased or excess water flows further are able to pass through the filter bag through the use of the flaps formed in the upper surface or wall of the filter bag body. This helps prevent the filter bag from becoming overwhelmed with a water flow and thus becoming dislodged or blocking the further passage of the water therethrough.

Once the filter bag has been filled as illustrated in FIG. 5, its first or proximal end is removed from the collar member such as by cutting the bag away or loosening the fastener therefrom. The open first end of the filter bag then is closed or sealed. The sealed filter bag with its collected sediment and/or silt then can be removed and used as a stabilizing or retaining means, similar to sandbags, for erosion control, or can be left in place if so desired, as indicated in FIG. 5, and a new filter bag placed over the outlet and overlaid over the previously filled filter bag 10. In addition, holes can be cut in the filter bag body and vegetation such as trees or other plants can be planted in the sediment collected within filter bag, which typically comprises a rich growing medium for such plants, to support vegetation growth around the discharge end of the outlet pipe for erosion control.

It can thus be seen that the present invention provides a simple and efficient mechanism for filtering and collecting silt, sediment and other debris from runoff water flows from storm water drainage systems and which traps such silt and other debris, especially which is generated during new constructions, to prevent this material from being washed into and collecting in ponds, rivers, streams, etc. and creating a potential environmental hazard to such ponds and streams, which could pose a danger to animals and humans. It will further be understood by those skilled in the art that various modifications, changes and substitutions can be made to the foregoing described embodiments of the present invention without departing from the spirit and scope of the present invention as set forth in the following claims.

What is claimed is:

1. A filter assembly for filtering silt and debris from a water flow passing through an outlet pipe of a storm water runoff drainage system, comprising:

a filter bag formed from a porous filtering material to enable the water to pass therethrough while retaining silt and debris therein;

said filter bag including a body having an open upstream end through which the water flow with silt and debris contained therein is received, and a closed downstream end defining a bag chamber in which the silt and debris filtered from the runoff storm water flow is collected; and a collar member of a size and configuration having an expansion assembly mounted therein for adjusting the size of said collar member to engage to a side wall of the outlet pipe to mount said collar member to the outlet pipe, and a rim at one end of said collar member and about which said upstream end of said filter bag is mounted for attaching said filter bag to the outlet pipe, wherein said expansion assembly comprises a series of expansion bolts mounted to opposing sides of said collar member, and a turnbuckle positioned between each of said expansion bolts and which engages and urges said expansion bolts toward and away from each other to expand and contract said collar member to fit within the outlet pipe.

2. A filter assembly for filtering silt and debris from a water flow passing through an outlet pipe of a storm water runoff drainage system, comprising:

a filter bag formed from a porous filtering material to enable the water to pass therethrough while retaining silt and debris therein;

said filter bag including a body having an open upstream end through which the water flow with silt and debris contained therein is received, and a closed downstream end defining a bag chamber in which the silt and debris filtered from the runoff storm water flow is collected, wherein said filter bag includes a series of flaps formed in the body thereof for enabling excess water to drain from said filter bag; and a collar member of a size and configuration having an expansion assembly mounted therein for adjusting the size of said collar member to engage to a side wall of the outlet pipe to mount said collar member to the outlet pipe, and a rim at one end of said collar member and about which said upstream end of said filter bag is mounted for attaching said filter bag to the outlet pipe.

3. A filter assembly for cleaning silt and debris from water flows from a drainage system outlet pipe comprising:

a filter bag having a bag body formed from a porous filtering material to enable the water flow to pass therethrough, said bag body having an open first end position in communication with the outlet pipe to receive the water flows therefrom and a closed second end defining an internal chamber within said filter bag within which the silt and debris filtered from the water flows is collected;

a collar member having an upstream end received within the outlet pipe, a downstream end over which said first end of said filter bag is placed and secured for connecting said filter bag to the outlet pipe in fluid communication therewith, and a side wall having an adjustable construction for mounting said filter bag to the outlet pipe, wherein said collar member further includes an expansion assembly comprising a series of expansion bolts mounted to opposing sides of said collar member, and a turnbuckle positioned between each of said expansion bolts and which turnbuckle engages and urges said expansion bolts toward and away from each other to expand and contract said collar member to fit within the outlet pipe.

* * * * *